United States Patent [19]

Beckwith

[11] Patent Number: 4,692,320

[45] Date of Patent: Sep. 8, 1987

[54] METHOD OF MAKING OXYNITRIDES

[75] Inventor: Elaine C. Beckwith, Riverview, Mich.

[73] Assignee: Ford Motor Company, Dearborn, Mich.

[21] Appl. No.: 813,169

[22] Filed: Dec. 24, 1985

[51] Int. Cl.$^4$ .............................................. C01F 17/00
[52] U.S. Cl. .................................... 423/263; 423/326; 423/351
[58] Field of Search ........................ 423/263, 351, 326

[56] References Cited

U.S. PATENT DOCUMENTS 4,102,698  7/1978  Lange et al. .......................... 106/65
4,501,723  2/1985  Ezis et al. ............................. 423/263

OTHER PUBLICATIONS

Hamon et al, "Revue de Chimie Minerale", vol. 12, 1975, pp. 259–267.
Marchand et al, "C. R. Acad. Sc. Paris", vol. 281, 1975, pp. 307–308.
Marchand, "C. R. Acad. Sc. Paris", vol. 283, 1976, pp. 281–283.

Primary Examiner—H. T. Carter
Attorney, Agent, or Firm—Joseph W. Malleck; Leonard Tachner

[57] ABSTRACT

The invention is a method of making ultrapure silicon yttrium oxynitride by using the steps of (a) in an argon stream, heating hydrated yttrium nitrate to a substantially dehydrated point; (b) adding to such heated hydrated yttrium nitrate an amount of silicon diimide to form a suspension and continuing to heat the mixture to melting so as to react the water of hydration of said nitrate with said silicon diimide and thereby form stoichiometric amounts of silica and yttrium/nitrogen/oxygen complex; and (c) heating said silica and nitrate in an inert atmosphere to an elevated temperature and for a period of time to chemically form ultrapure silicon yttrium oxynitride. The temperature of heating the hydrated yttrium nitride can be to a range of 340°–360° C. which is 85–92% of the dehydration point of yttrium nitrate. The temperature to which the mass of step (c) is heated can be in the range of 1450°–1600° C. and the time period can be in the range of 5–6 hours.

9 Claims, No Drawings

METHOD OF MAKING OXYNITRIDES

BACKGROUND OF THE INVENTION

1. Field of the Invention

This invention relates to the art of making oxynitrides and, more particularly, to the making of silicon yttrium oxynitrides.

2. Description of the Prior Art

Silicon yttrium oxynitrides typically are made as byproducts of heating a ternary system of silicon nitride and oxide sintering aids without melting the silicon nitride (see U.S. Pat. No. 4,102,698). Alternatively, stoichiometric amounts of silicon nitride and oxides can be heated to form specific oxynitrides, again without melting the silicon nitride (see U.S. Pat. No. 4,501,723). Unfortunately, both of these methods do not yield the oxynitride in the desired purity condition (greater than 99.98%) needed for improved grain boundary control when incorporated into ceramics such as silicon nitride and are particle size dependent.

With respect to purity, the lack of it stems primarily from the inability to provide starting materials with both sufficient overall purity and sufficient upper limit on contaminant content and contaminant particle size. Silicon nitride, as a starting material, should have a purity in excess of 99.98%. Unfortunately, silicon nitride is predominantly formed by nitriding raw silicon powder along with other ingredients, and the starting silicon powder is typically commercially available in purity forms up to only 98%. The major trace metal contaminants normally experienced with such commercially available silicon powder include: iron in an amount of 1.0%, aluminum—0.5%, manganese—0.09%, and calcium—0.01%. Nonmetallic contaminants are usually present in amounts of 0.2% carbon and 2.0% oxygen. In addition and of significance is the fact that some of these impurity particles can be as large as 100 microns. These impurities of trace metals, oxygen and carbon, as well as halides or sulfur, in such early starting material find their way into the resultant silicon nitride ceramic, affect the oxynitrides formed, and eventually cause catastrophic failure of the ceramic. Moreover, contaminants can be introduced by attrition during mechanical grinding of the silicon powder or silicon nitride powder; the milling media or compacters wear during such mechanical manipulations causing undesirable compositional changes or lack of homogeniety in the grain boundary of the resulting ceramic and ultimately degradation of high temperature strength.

The purity problem has another aspect, the incorporation of impurities as a result of processing rather than the starting materials. First, the wide particle size distribution of conventional starting powders presents variable surface areas throughout the commercially available starting powder, which limits effective oxygen control so as to consistently create not only the desired silicon-yttrium-oxynitride phases, but also attendent oxide complexes; this results in strength variations in the final product.

Secondly, inadequate maximum particle size control of the starting materials leads to problems in the ceramic. In the prior art methods of manufacture of the starting materials, dry milling is employed to mix the ingredients and to provide an increased particle size distribution by comminution through the milling action. Dry milling promotes a broader particle size distribution which, in turn, provides better packing density for the powder material. However, in dry milling, the powders typically cake along the sides of the container and result in unsatisfactory maximum particle size control and homogeneity. With such a dry milled powder, attrited trace metal impurities and/or inadequate nitriding of large silicon particles will lead to the formation of silicides during processing which become sites for grain growth or critical flaws in the final ceramic. To show the lack of maximum particle size control (over 20 microns), representative starting material particle sizes are given. Silicon nitride powder used to make the prior art oxynitrides has an average starting particle size usually in the range of 7–10 microns which permits particles up to 150 microns to be present along with finer particles. [Average or mean particle size means 50% of the particles will be above the mean value and 50% will be below; this specifies an average size point, but leaves undefined the particle size above the average point.] Yttria, which is added to the silicon nitride to make the prior art oxynitrides, usually is available on the commercial market with an average particle size of about 0.04 microns and can have particles present as large as 40 microns. The $SiO_2$, which may be added to the mixture, usually has a submicron average particle size, but allows maximum particles to be present as large as 50 microns. The presence of large particles inhibits proper gas phase formation of the oxynitride.

These powder mixtures containing a major component and several minor components with broad range and different particle sizes are generally recognized as difficult to disperse by conventional blending and milling techniques. The overall impurity levels, the maximum contaminant particle size, and the homogeneity of the powder mixture are important in determining the ceramic's performance and reliability. Prior art wet milling techniques are disadvantageous because the resulting powder typically becomes contaminated with organic residues.

What is needed is a method by which oxynitrides may be selectively and consistently made in an ultra-high purity condition and in a much finer and uniform particle size than has been possible heretofore.

It is an object of this invention to make ultrapure oxynitrides of specific phase and in a much finer and uniform particle size than has been possible heretofore.

SUMMARY OF THE INVENTION

The invention is a method of making ultrapure silicon yttrium oxynitride by using the steps of: (a) first heating hydrated yttrium nitrate in an inert flowing atmosphere to a molten condition and to a temperature just below the complete dehydration temperature point for substantial dehydration of such compound; (b) agitatingly adding to such molten yttrium nitrate an amount of silicon diimide to form a substantially uniform suspension and continuing to heat the suspension so as to react the water of dehydration of said nitrate with said silicon diimide to thereby form a mass of stoichiometric amounts of encapsulating silica and $YN_aO_b$ complex; and (c) second heating of said silica, remaining silicon imide and dehydrated $YN_aO_b$ complex in an inert atmosphere to an elevated temperature and for a period of time to chemically form ultrapure silicon yttrium oxynitride.

Preferably, the temperature of heating the hydrated yttrium nitrate is to a range of 340°–360° C. which results in achieving 85–92% of the dehydration point of yttrium nitrate. Preferably, the temperature to which the mass of step (c) is heated is in the range of 1450°–1600° C. and the time period is in the range of 4–6 hours. Advantageously, there is no compaction required in this method because the melt results in intimate particle/liquid contact.

In order to form the specific silicon oxynitride having the formula $Si_6Y_{10}O_{24}N_2$, 20 mole parts of the hydrated yttrium nitrate is used along with 12 mole parts of the silicon imide; the first heating is carried out at a temperature so as to at least reach the 85% dehydration point of the yttrium nitrate; and then the elevated heating is carried out at a temperature of about 1450° C. for at least four hours to form the $Y_{10}$ oxynitride.

Advantageously, to form the specific oxynitride having the formula $SiYO_2N$, four mole parts of hydrated yttrium nitrate is utilized along with four mole parts of silicon diimide; the first heating is carried out at a temperature of 350° C. so as to reach at least the 92% dehydration point of the hydrated yttrium nitrate; and the elevated heating of the remaining residual mass is carried out at a temperature of about 1600° C. for a period of at least six hours to form the $Y_1$ oxynitride.

DETAILED DESCRIPTION AND BEST MODE

To make silicon yttrium oxynitride in the desired ultrapure state and desired uniform fine particle size, three essential steps are required: (a) heating in an inert atmosphere a predetermined amount of hydrated substantial dehydration point (in the range of 85–92%); (b) agitatingly adding (with mechnical or ultrasonic stirring) a predetermined amount of silicon diimide to the molten, substantially dehydrated yttrium nitrate to form a suspension, while continuing to effectively heat the suspension to react the water of hydration of said nitrate with the silicon diimide to thereby form encapsulating silica along with a residue of $YN_aO_b$ complex; and (c) heating the silica, the silicon diimide, and dehydrated yttrium nitrate to a critical temperature level and for a period of time in an inert atmosphere to chemically form the desired yttrium silicon oxynitride.

Heating Nitrate for Dehydration

A specific number of mole parts of hydrated yttrium nitrate [$Y(NO_3)_3 \cdot 6H_2O$] is heated in an inert atmosphere (such as an argon stream) to a temperature which promotes a condition just below the complete dehydration point for the nitrate for substantial dehydration (substantially dehydrated is defined to mean herein at least 85% and up to 92%). The temperature range of about 340°–360° C. is utilized for this purpose and heating is carried out for a period of time of about 2–4 hours which is effective to reach at least the 85% dehydration point of the yttrium nitrate. The yttrium nitrate is selected to have a purity of 99.9999%.

During this initial heating, the yttrium nitrate will undergo substantial change in chemical/physical properties so that it will change from a powder to a melt. The heating must be carried out to a level that substantially dehydrates the nitrate; it is suggested the temperature levels of 340°–360° C. promote this effect. If it is heated to a level substantially below 340° C., dehydration will be severely limited to less than about 50%. If heated to above 360° C., 100% dehydration will occur, which is disadvantageous because there will be no water of hydration to combine with the imide to form silica, the water of hydration being swept away in the flowing atmosphere (argon stream).

Introducing Silicon Diimide to Melt

A predetermined number of mole parts of silicon diimide is agitatingly added to the heated, melted, and substantially dehydrated $YN_aO_b$ complex. Agitation is usually by mechanical or ultrasonic stirring. The silicon diimide $Si(NH)_2$ is selected to have a starting purity of greater than or equal to 99.98% and is best prepared by the method disclosed in copending U.S. application Ser. No. 812,036, filed 12-23-85 commonly assigned to the assignee of this invention and the disclosure of which is incorporated herein by reference. Essentially, the process for making ultrapure $Si(NH)_2$ comprises: (1) continuously reacting liquid silicon halide ($SiCl_4$) with an excess of liquid ammonia (i) in the substantial absence of contaminants (ii) at a reaction situs in an inert atmosphere to form the silicon imide as a precipitate and (iii) with a ratio of liquid ammonia to silicon halide (equal to or greater than 21 molar) effective to completely react the silicon halide, to solubilize the ammonium chloride side product, and to maintain the desired viscosity for filtering; (2) simultaneously and continuously withdrawing a filtered portion of the excess liquid ammonia (containing the side product ammonium chloride) to leave the silicon imide precipitate in the reaction situs; and (3) adding ammonia to the excess of ammonia in the reaction situs to replace the withdrawn filtered portion of the liquid ammonia. The reaction is carried out with vigorous stirring of the liquid suspension/solution and with the atmosphere over the entire mixture is regulated to contain only ammonia vapor and nitrogen. The temperature of the liquid mixture is maintained between $-33.3°$ C. to $-69°$ C. by employing a cooling jacket containing dry ice or a slush of dry ice and acetone, isopropanol or cellosolve, and by recycling the withdrawn liquid ammonia and readding it to the reaction situs either as a cooling liquid or as a heating gas.

The silicon imide $Si(NH)_2$ produced by this process will exhibit a pure white color, have an average particle size of less than one micron, will be extremely dry, readily becomes statically charged due to the high surface area and ultra clean surface, will contain silicon-nitrogen and nitrogen-hydrogen bonds, and will have a purity of greater than or equal to 99.98% as tested by ICP and high temperature combustion infrared technique. The imide has a capability of decomposing under heat to form silicon nitride having greater than 90% alpha content and will have the capability of reacting with water to form silicon dioxide.

The imide is stirred into the viscous molten mass of substantially dehydrated yttrium-nitrogen-oxygen complex and the heating is continued in the inert atmosphere at a temperature level of 350° C. to generate the evolution of brown fumes (mixed oxides of nitrogen). The heating is continued for a period until the evolution of brown fumes cease, usually about four hours. This allows the water of hydration of the nitrate with the silicon diimide to form stoichiometric amounts of encapsulating silica along with the residual of $YN_aO_b$ complex. Such silica is of very high purity and is thus formed in situ. The resultant mass is a white homogeneous powder.

Heating at Elevated Temperature to Form Yttrium Silicon Oxynitride

The white homogeneous powder is then heated to a higher reactive temperature. This is usually carried out to a temperature level in the range of 1450°–1600° C. for 5–7 hours in an inert atmosphere to establish the chemical reaction.

To promote a specific and desired yttrium silicon oxynitride, such as $Si_6Y_{10}O_{24}N_2$, 20 mole parts of hydrated yttrium nitrate are employed and heated to about the temperature range of 340°–360° C. which achieves at least the 85% dehydration point for the yttrium nitrate. To such dehydrated melted mass is added 12 mole parts of silicon diimide which, after allowing for the reaction of the diimide with the water of hydration, is then heated to the elevated temperature of about 1500° C. for about six hours to form the $Y_{10}$ oxynitride.

To form the specific oxynitride $SiYO_2N$, four mole parts of hydrated yttrium nitrate is heated to a temperature level of 360° C. to achieve at least the 92% dehydration point of the yttrium nitrate. To the molten dehydrated yttrium-nitrogen-oxygen complex are added four mole parts of silicon diimide and which, after allowing for the reaction of the hydration water with the silicon diimide, is then heated to the elevated temperature of about 1600° C. for at least six hours to form the $SiYO_2N$ compound.

The resulting oxynitride compounds are characterized by the following physical characteristics: a color of white, an impurity content (trace metals, sulfur, halide and carbon) being less than 0.02% by weight, and loose agglomerated particles with a maximum particle size usually no greater than 20 microns.

EXAMPLES

Table I illustrates how the physical properties of the resultant product may vary with certain aspects such as the proportions of starting materials, temperature levels and time period at selected heating temperatures, and with the purity of the starting materials. It is advantageous to obtain greater than 75% $Y_{10}$ phase in the product with less than 0.02% impurities. When the mole ratio is from 1 to 1.67, the purity of the starting materials is at or greater than 99.99%, and substantial dehydration (85–92%) is accomplished, the goal of greater than 75% $Y_{10}$ phase will be achieved. When excessive dehydration or insufficient dehydration is attained, inadequate $Y_{10}$ phase is achieved. When the mole ratio is excessive, improper $Y_{10}$ phase is attained, and when oxygen impurity is present in the starting materials, the $Y_{10}$ content is detrimentally affected. In cases where $Y_{10}$ is reduced, $Y_1$ increases and $Y_2$ phase appears where there is no $SiO_2$ component, such as with 100% dehydration.

While particular embodiments of the invention have been illustrated and described, it will be understood that various changes and modifications may be made without departing from the invention, and it is intended to cover in the appended claims all such changes and modifications as fall within the true spirit and scope of the invention.

TABLE I

| Sample | A/B Mole Ratio | A/B Purity | Percent Dehydration | Temp. °C. Dehydration/ SiYON Formation | Time Period (Hrs.) For Melting, Silica Formation, Oxynitride Formation | Impurities Present: Trace Metals, Sulfur, Carbon, Halide | Si—Y—O—N Phases |
|---|---|---|---|---|---|---|---|
| 1 | 1.67 | 99.9999 / 99.99 | 85 | 350/1460 | 3, 4 & 6 | <.02% | >75% $Y_{10}$ |
| 2 | 1 | 99.9999 / 99.99 | 92 | 350/1580 | " | " | >75% Y |
| 3 | 1.67 | 99.9999 / 99.99 | 100 | 750/1460 | " | " | <25% $Y_{10}$ or Y (N Phase Strong) |
| 4 | " | 99.9999 / 99.99 | 20 | 350/1580 | ¾, 3/2 & 6 | — | <25% $Y_{10}$ or Y (Silicates Strong) |
| 5 | 10 | 99.9999 / 99.99 | 85 | 350/1460 | 3, 4 & 6 | <.02% | Less Than 15% $Y_{10}$ |
| 6 | 1.67 | 1.5% $O_2$ Additional | " | " | " | — | Less Than 25% $Y_{10}$ |
| 7 | 2 | 99.9999 / 99.99 | 96 | 350/1500 | " | " | >75% $Y_4Si_2O_7N_2$ |

A is $Y(NO_3)\cdot 6H_2O$
B is $Si(NH)_2$

I claim:

1. A method of making a ultrapure silicon yttrium oxynitride, comprising the steps of:
   (a) heating hydrated yttrium nitrate in an inert flowing atmosphere to a molten condition and to a temperature just below its dehydration temperature to form a dehydrated yttrium-nitrogen-oxygen complex;
   (b) agitatingly adding to such molten yttrium-nitrogen-oxygen complex an amount of $Si(NH)_2$ to form a substantially uniform suspension of stoichiometric dehydrated yttrium-nitrogen-oxygen complex; and
   (c) heating said suspension of silicon imide, silica, and dehydrated yttrium-nitrogen-oxygen complex to a sufficient, second temperature and for sufficient time to chemical react said suspension and form said silicon yttrium oxynitride.

2. The method as in claim 1, in which said second temperature is in the range of 1400°–1600° C.

3. The method of making an ultrapure silicon yttrium oxynitride, comprising the steps of:
   (a) heating hydrated yttrium nitrate in an inert atmosphere to a temperature just below its complete dehydration temperature to form a melt;
   (b) agitatingly adding silicon diimide to said heated yttrium nitrate to form a mixture and continuing to heat the mixture to react the water of hydration of said yttrium nitrate with said silicon diimide and thereby form encapsulating silica and a yttrium-nitrogen-oxygen complex; and (c) heating said silica, silicon imide, and yttrium-nitrogen-oxygen complex in an inert atmosphere to a sufficient second temperature and for a sufficient period of time to chemically form ultrapure silicon yttrium oxynitride.

4. The method as in claim 3, in which said hydrated yttrium nitrate is heated to at least 85% dehydration to form a substantially dehydrated melt, silicon diimide is added to said melt in molecular proportion of 12 parts silicon diimide to 20 parts hydrated yttrium nitrate, and the melt and silicon diimide are then heated to the temperature of 1450° C. for at least six hours to form $Si_6Y_{10}O_{24}N_2$.

5. The method as in claim 3, in which said hydrated yttrium nitrate is heated to at least 92% dehydration, to which is added silicon diimide to form a dehydrated melted mass in molecular proportions of four parts silicon diimide to four parts hydrated yttrium nitrate, and said mass is then heated to 1560° C. for a period of at least six hours to form $SiYO_2N$.

6. The method as in claim 3, in which the temperature to which said hydrated yttrium nitrate is heated in step (a) to effect said dehydration is in the range of 340°–360° C.

7. The method as in claim 3, in which the degree to which said nitrate is dehydrated is at least 85%.

8. The method of claim 3, in which the heating in step (c) is at a temperature in the range of 1500°–1600° C. and is conducted for a period of 4–6 hours.

9. The method of claim 1, in which said silicon yttrium oxynitride has less than 0.02% trace metal, sulfur, carbon, and halide impurity and is in a loose agglomerated state.

* * * * *